United States Patent
Kumar et al.

(10) Patent No.: US 7,680,051 B2
(45) Date of Patent: Mar. 16, 2010

(54) OPTIMIZING TCP TRAFFIC VIA AN SCTP ASSOCIATION

(75) Inventors: Nipa Kumar, Santa Clara, CA (US);
Randall Stewart, Chapin, SC (US);
Peter Lei, Arlington Heights, IL (US);
Ming Chen, Fremont, CA (US);
Kenneth Durazzo, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 401 days.

(21) Appl. No.: 11/711,959

(22) Filed: Feb. 28, 2007

(65) Prior Publication Data

US 2008/0205445 A1  Aug. 28, 2008

(51) Int. Cl.
*H04L 12/28* (2006.01)
*H04J 3/24* (2006.01)

(52) U.S. Cl. .................. 370/236; 370/392; 370/474

(58) Field of Classification Search ................. 370/236, 370/392, 474
See application file for complete search history.

(56) References Cited

U.S. PATENT DOCUMENTS

| | | | |
|---|---|---|---|
| 6,963,921 B1 | 11/2005 | Yang et al. | |
| 7,051,109 B1 | 5/2006 | Stewart et al. | |
| 7,058,058 B2 | 6/2006 | Singh et al. | |
| 7,158,522 B1 | 1/2007 | Singh et al. | |
| 2002/0016937 A1* | 2/2002 | Houh | 714/43 |
| 2004/0028009 A1* | 2/2004 | Dorenbosch et al. | 370/329 |
| 2006/0193295 A1* | 8/2006 | White et al. | 370/336 |
| 2006/0248194 A1* | 11/2006 | Ly et al. | 709/226 |
| 2007/0002822 A1* | 1/2007 | Huang | 370/349 |
| 2007/0086486 A1* | 4/2007 | Park et al. | 370/474 |
| 2007/0118604 A1* | 5/2007 | Costa Requena | 709/206 |
| 2008/0031239 A1* | 2/2008 | Kapoor et al. | 370/389 |
| 2008/0056263 A1* | 3/2008 | Jain et al. | 370/392 |
| 2008/0207187 A1* | 8/2008 | Maillard | 455/418 |
| 2009/0094371 A1* | 4/2009 | Ly et al. | 709/228 |

OTHER PUBLICATIONS

Morihiro Kouda, "Proxy Mechanism of Multiplexing TCP Connections over Satellite Internet", 35 pages, Feb. 13th, 2002, Department of Informatics and Mathematical Science, Graduate School of Engineering Science, Osaka University.

* cited by examiner

*Primary Examiner*—Andrew Lee
(74) *Attorney, Agent, or Firm*—Micahel C. Stephens, Jr.; Trellis IP Law Group, PC (57) ABSTRACT

In one embodiment, a method can include: (i) pre-configuring a stream control transmission protocol (SCTP) association; (ii) receiving a transmission control protocol (TCP) packet in a network device, where the TCP packet is intended for a destination node; (iii) encapsulating the TCP packet into an SCTP payload; and (iv) transmitting the SCTP payload across a wide area network (WAN).

22 Claims, 7 Drawing Sheets

OPTIMIZING TCP TRAFFIC VIA AN SCTP ASSOCIATION

TECHNICAL FIELD

The present disclosure relates generally to optimizing transmission control protocol (TCP) traffic using a stream control transmission protocol (SCTP) association.

BACKGROUND

When a transmission control protocol (TCP) session is used across a latent network connection, excessive time may be consumed for TCP to reach an optimal transfer rate. This amount of time depends largely on the particular latencies and/or packet losses observed within the network.

This delay of an optimal transfer rate may be due to a slow start implementation in the TCP stack, where TCP slowly increases or scales its transfer rate based upon successful receipt of acknowledgments from a receiver. Also, conventional approaches may suffer from inefficient use of available bandwidth due to retransmission procedures when packet loss occurs.

DESCRIPTION OF EXAMPLE EMBODIMENTS

Overview

In one embodiment, a method can include: (i) pre-configuring a stream control transmission protocol (SCTP) association; (ii) receiving a transmission control protocol (TCP) packet in a network device, where the TCP packet is intended for a destination node; (iii) encapsulating the TCP packet into an SCTP payload; and (iv) transmitting the SCTP payload across a wide area network (WAN).

In one embodiment, a method can include: (i) receiving an SCTP payload in a network device coupled to a WAN, where the SCTP payload includes an encapsulation of a first TCP packet, and the first TCP packet is intended for a destination node; (ii) de-encapsulating the SCTP payload; and (iii) regenerating the first TCP packet for transmission to the destination node.

In one embodiment, an apparatus can include: (i) a first interface configured to receive TCP packets; (ii) a circuit configured to encapsulate the TCP packets into SCTP payloads; and (iii) a second interface configured to transmit the SCTP payloads.

In one embodiment, an apparatus can include: (i) a first interface configured to receive SCTP payloads having encapsulated TCP packets; (ii) a circuit configured to de-encapsulate the SCTP payloads and regenerate the TCP packets; and (iii) a second interface configured to transmit the TCP packets.

Example Embodiments

In particular embodiments, bandwidth utilization/latency may be improved over conventional approaches because stream control transmission protocol (SCTP) can allow for bundling various transmission control protocol (TCP) sessions into one SCTP association. For example, multiple TCP packets from a same flow can be bundled into one SCTP message to be sent in one stream on an association, or multiple TCP sessions may be bundled into one SCTP association (i.e., on different streams in the same association). SCTP is an IETF (Internet Engineering Task Force) RFC 2960 protocol, and all relevant portions of RFC 2960 are incorporated herein by reference. Particular embodiments can also allow for an efficient SCTP "chunk"-based "sack" (selective acknowledgment) implementation. Such a chunk-based sack implementation may allow for improved performance via a wide area network (WAN) over a single TCP sack implementation, particularly in the presence of packet loss.

In particular embodiments, a performance-enhancing proxy (PEP) (e.g., an adapter, appliance, or daughter-card associated with a router or other network infrastructure device) can be provided to terminate TCP connections, and to multiplex these connections into one or more SCTP streams and/or associations. Generally, TCP connections using a same quality of service (QoS) can be multiplexed into different streams on the same association, while TCP connections using different QoS mechanisms may be multiplexed into different associations, one per QoS class, for example. By using an SCTP association, a relatively long-lived flow may be used as a base for establishing bandwidth flow control optimization characteristics across a latent link, which can be accommodated over a duration of time and traffic.

Particular embodiments can include an adapter, appliance, or packet service module (e.g., located inside, or coupled to, a router or other network infrastructure device) that performs encapsulation from TCP into SCTP for transmission on the sender-side, and de-encapsulation on the receiver-side. Data can be encapsulated into a different protocol (e.g., SCTP) to go across a WAN in order to reduce the impacts of latency and/or packet losses along that path. An equivalent end-to-end TCP session may be set up (e.g., via a transmission of a three-way handshake "SYN/SYN-ACK/ACK" across the communications medium of the path), setting up a connection between a host and a server before further optimizing the traffic. Such host and server connections can include server-to-server, client-to-client, or any other TCP-based communication link, for example.

In addition, head-of-line blocking between TCP user sessions, as seen in conventional full-TCP approaches, can be eliminated or reduced by using SCTP streams for the user sessions. Further, local acknowledgments for TCP sessions after a three-way handshake may be accommodated, and data can be sent via SCTP after such a three-way handshake. Conventional approaches can utilize a proxy function to terminate the TCP connection, and then transmit over the WAN in some other protocol (e.g., user datagram protocol (UDP)). However, such conventional approaches may result in lost data when there is an inappropriate acknowledgment to a SYN message, or no such acknowledgment is forthcoming. In particular embodiments, an end-to-end TCP connection can be "semantically" delivered such that a local acknowledgment for "window scaling" can be employed. Essentially, a local acknowledgment allows for appropriate acknowledgment for approved communications across the WAN in expedited fashion, thus providing for improved TCP performance.

A TCP segment may represent an amount of data that TCP may send for a particular communications aspect or unit, while SCTP may utilize chunks of data in transmission. If any one TCP segment is lost in a full-TCP protocol, the rest of the message would have to wait for retransmission of that entire segment (i.e., head-of-line blocking). Because multiple SCTP data chunks may be included in the packet, the SCTP receiver may allow for retransmission of only the dropped chunks, and not the entire message, as in full-TCP approaches. Accordingly, using different streams for different TCP connections can allow for avoiding such head-of-line blocking problems.

In particular embodiments, an overall bandwidth efficiency, SCTP pipe utilization, and maintenance of the congestion window information contained in the proxy, can allow for improved decisions related to issuing local acknowledgments to incoming TCP sessions. These local acknowledgments can allow for scaling substantially to a maximum capacity of the SCTP association in a relatively short time period.

In particular embodiments, "multi-homing," or multiple addresses on each side, in an SCTP association can be used to gain fault tolerance to the TCP connections that would typically choose only one path through the network. Also, the aggregation of TCP user data into a single association may result in a higher probability that the congestion window or "cwnd" (e.g., related to an amount of data that can be sent) across a latent link increases, since it is likely that the congestion window may be increased rapidly. Thus, more data can be sent in a shorter amount of time than in a corresponding native TCP-only implementation. In some examples, the congestion window being fully used is a condition to an increase of cwnd.

In particular embodiments, a TCP terminating proxy can optimize TCP traffic by rapidly increasing transmission rates of TCP via local acknowledgments and multiplexing the TCP sessions into an SCTP association. Further, more efficient use of bandwidth of a latent link, as compared to other approaches, can be facilitated. Further, particular embodiments can also allow for multiple SCTP associations, which can be used for traffic prioritization/classification of traffic, and the like.

Design considerations for a system for TCP optimization in particular embodiments can include: (i) decreasing TCP transmission latency over a WAN link, which is typically a relatively large delay component in a network; (ii) maintaining as much transparency as possible to a user; and (iii) minimizing impact to current customer networks.

Figure 1:
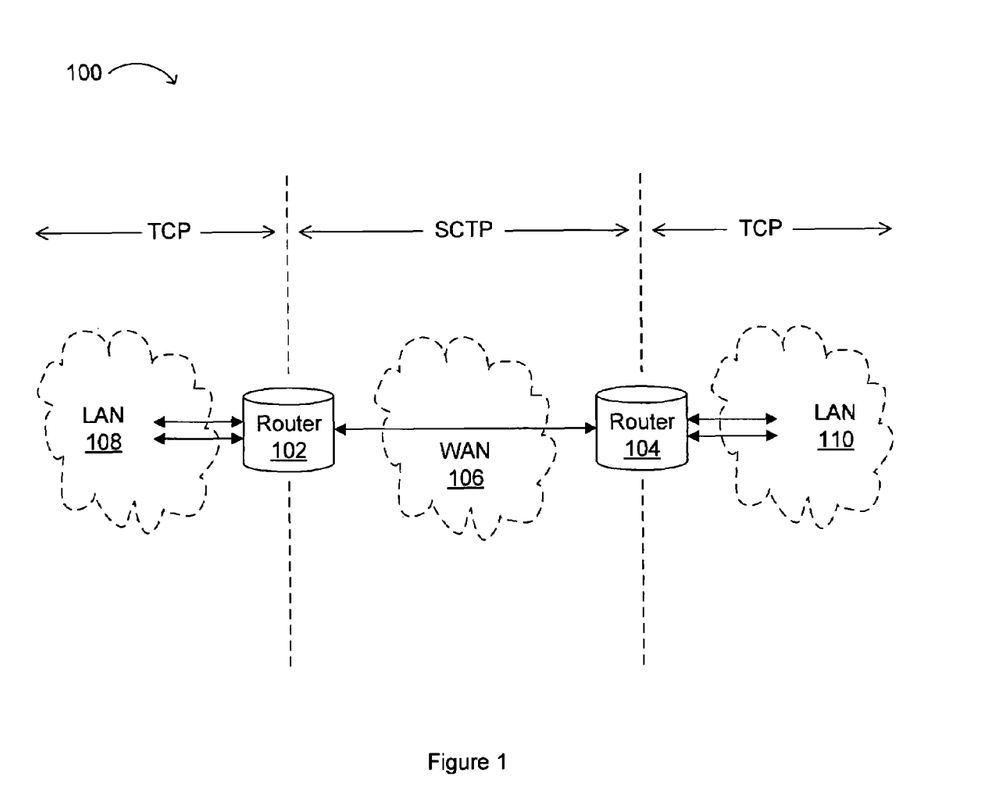
FIG. 1 illustrates an example router network arrangement for transmission control protocol (TCP) and stream control transmission protocol (SCTP) association.

Referring now to FIG. 1, an example router network arrangement for TCP and SCTP association is shown and indicated by the general reference character 100. Router 102 and router 104 can interface using SCTP through WAN 106. In particular embodiments, any infrastructure device or appliance proxy could be used in place of one or more "routers," as described herein. Using TCP, router 102 can interface with local area network (LAN) 108, and router 104 can interface with LAN 110. TCP flows may be terminated at a packet service module (e.g., a daughter-card or other component, which can be discreet from, or integrated with a router or other network device), and transported to the other side of a WAN edge router (e.g., 102 or 104). Generally, an SCTP protocol can include a capability to allow an application to bundle multiple TCP sessions into an SCTP association, such that the new TCP session may experience initial TCP initial slow start behaviors, followed by a faster ramp due to local acknowledgements and reduced latent transmission characteristics.

Figure 2:
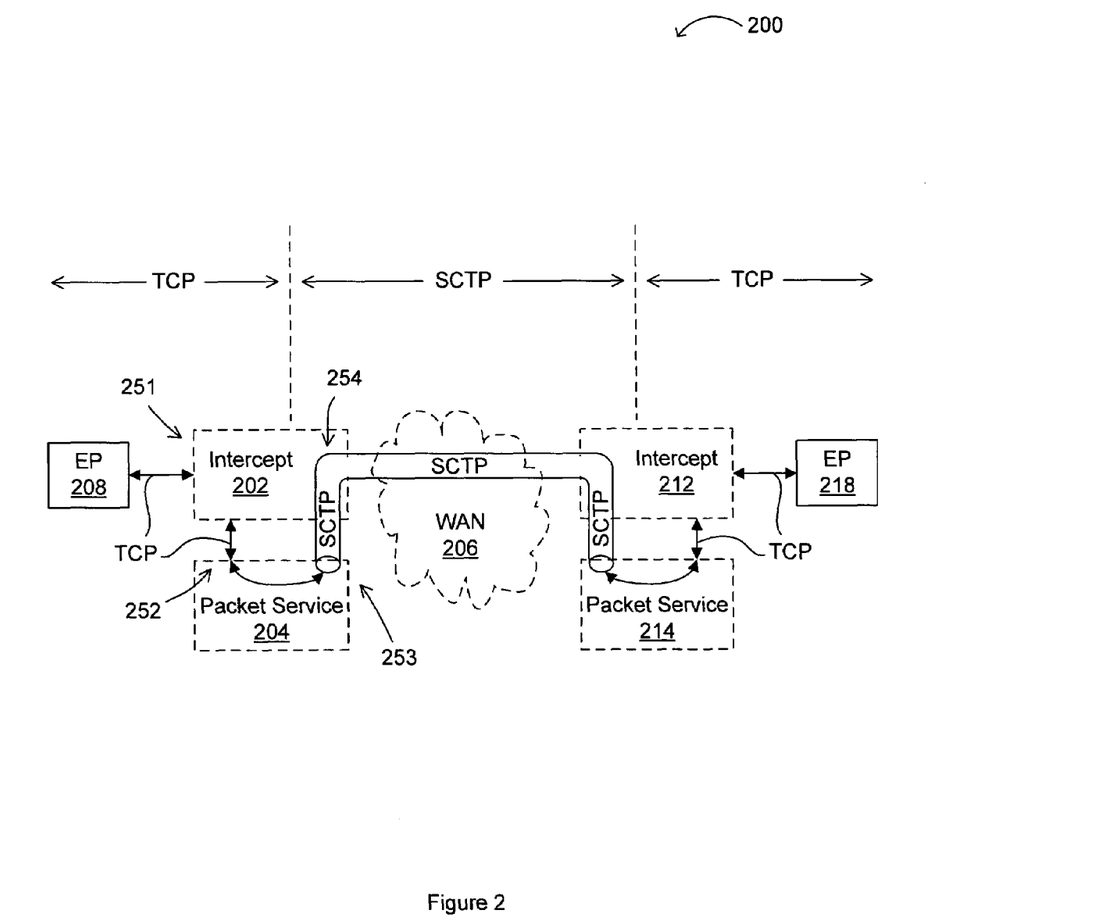
FIG. 2 illustrates an example TCP and SCTP association.

Referring now to FIG. 2, an example TCP and SCTP association is shown and indicated by the general reference character 200. Intercept module 202 can receive messages in TCP from endpoint (EP) 208, and can provide data to intercept 212 in SCTP over WAN 206. An EP can be a client, server, or any such device. Similarly, intercept module 212 can receive messages in TCP from EP 218, and can provide data to intercept module 202 over WAN 206. Further, each intercept module can be associated with a packet service module, such as intercept module 202 with packet service module 204, and intercept module 212 with packet service module 214.

Each intercept module can include an operating system (OS) based interception function support, including offloading TCP packets to a packet service module for termination. The packet interception may be substantially transparent to a user (e.g., at EP 208 or EP 218). For example, an original source/destination IP and TCP source/destination port may be preserved from a user perspective. An SCTP pipe between the packet service modules on a WAN edge route may be used to transport TCP segments between client and server, for example. Further, a packet service module gateway can maintain an association between TCP flow and stream identification within an SCTP pipe.

The packet encapsulations for a TCP flow at various points (e.g., 251, 252, 253, and 254) in FIG. 2, are also shown below in Table 1.

TABLE 1

| | | | | |
|---|---|---|---|---|
| 251 | L2 Header | IP | TCP | Payload |
| 252 | Ethernet Header | IP | TCP | Payload |
| 253 | Ethernet Header | IP (SCTP endpoint) | SCTP Header | Chunks |
| 254 | L2 Header/GRE/IPsec | IP (SCTP endpoint) | SCTP Header | Chunks |

In Table 1, point 251 can represent a packet coming into intercept 202 (e.g., an operating system), and an IP source address (SA) can be 10.0.0.1, while an IP destination address (DA) can be 20.0.0.1, for example. Point 252 can represent packet service 204 receiving an intercepted packet, with IP SA=10.0.0.1, and DA=20.0.0.1, for example. Point 253 can represent packet service 204 receiving or providing an SCTP packet, where IP SA=1.1.1.1, and DA=2.2.2.2, for example. Point 254 can represent an SCTP packet on the WAN (e.g., 206) interface. Further, depending on the particular type of WAN interface (e.g., point-to-point protocol (PPP), generic routing encapsulation (GRE), or IP security (IPsec)), encapsulation provided for the SCTP packet may vary accordingly. Further, particular embodiments may also be applied to other multipoint network deployments.

The end-to-end TCP connection from client to server may generally broken into three segments: (i) client to packet service module, blade, daughter-card, or appliance, which can be in TCP protocol (e.g., on a LAN segment); (ii) between two packet service modules, which can be in SCTP protocol over a WAN link); and (iii) packet service module to server, which can be in TCP protocol (e.g., on a LAN segment).

End-to-end TCP optimization can be considered as an effect of SCTP WAN optimization, where bundling segments from multiple TCP connections into an SCTP pipe may decrease response times of individual TCP connections during a slow start phase. Among the communication factors considered to fully utilize a WAN link are: (i) WAN link bandwidth; (ii) WAN link delay; and (iii) contention for bandwidth for different traffic types.

In minimizing latency, it is desirable to avoid data loss caused by improperly injecting too much traffic over a WAN link capacity, or exceeding a quality of service (QoS) policy allowed. Accordingly, the congestion control and flow control parameters to be set can include: (i) "ssthresh"—slow start threshold; (ii) "rwnd"—receiver announces rwnd (e.g., set to bandwidth x delay) to receive; and (iii). "cwnd"—sender limited to send cwnd.

Figure 3:
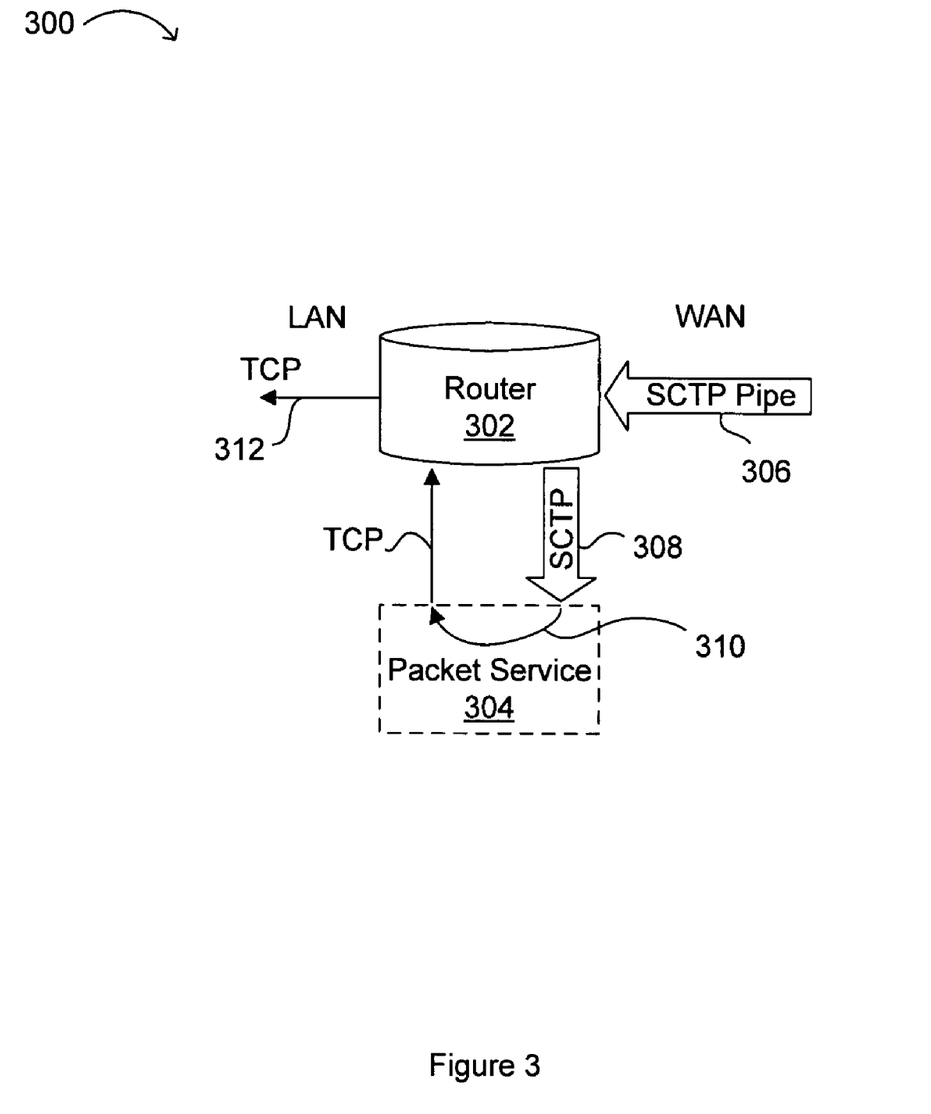
FIG. 3 illustrates an example packet traversal from a wide area network (WAN) to a local area network (LAN).

Referring now to FIG. 3, an example packet traversal from a WAN to a LAN is shown and indicated by the general reference character 300. Router 302 can receive SCTP pipe 306, and can pass through SCTP 308 to packet service module 304. TCP output 312 can be provided in the LAN space. SCTP 308 can traverse via gateway 310 and packet service module 304 to form this TCP message. Also, packet service module 304 can include a filter, which can be implemented in an operating system (e.g., Linux, Windows) space. The filter function can include performing metadata (e.g., 4-tuple/precedence) translation between a gateway and associated clients.

A gateway (e.g., 310) within packet service 304 can perform the following functions: (i) multiplexing/de-multiplexing TCP segments into/from SCTP streams; (ii) providing a protocol gateway function between TCP and SCTP: (iii) maintaining associations between TCP connections and SCTP stream IDs; (iv) establishing one or more SCTP associations; (v) programming SCTP and TCP socket options, according to policy settings; (vi) interfacing to SCTP for message bundling decisions; (vii) traffic pacing and flow control; (viii) interacting with filter for internal IP SA/DA, TCP SP/DP (4-tuple information) translation; and/or (ix) commanding OS turn on/off packet interception, for example.

Figure 4:
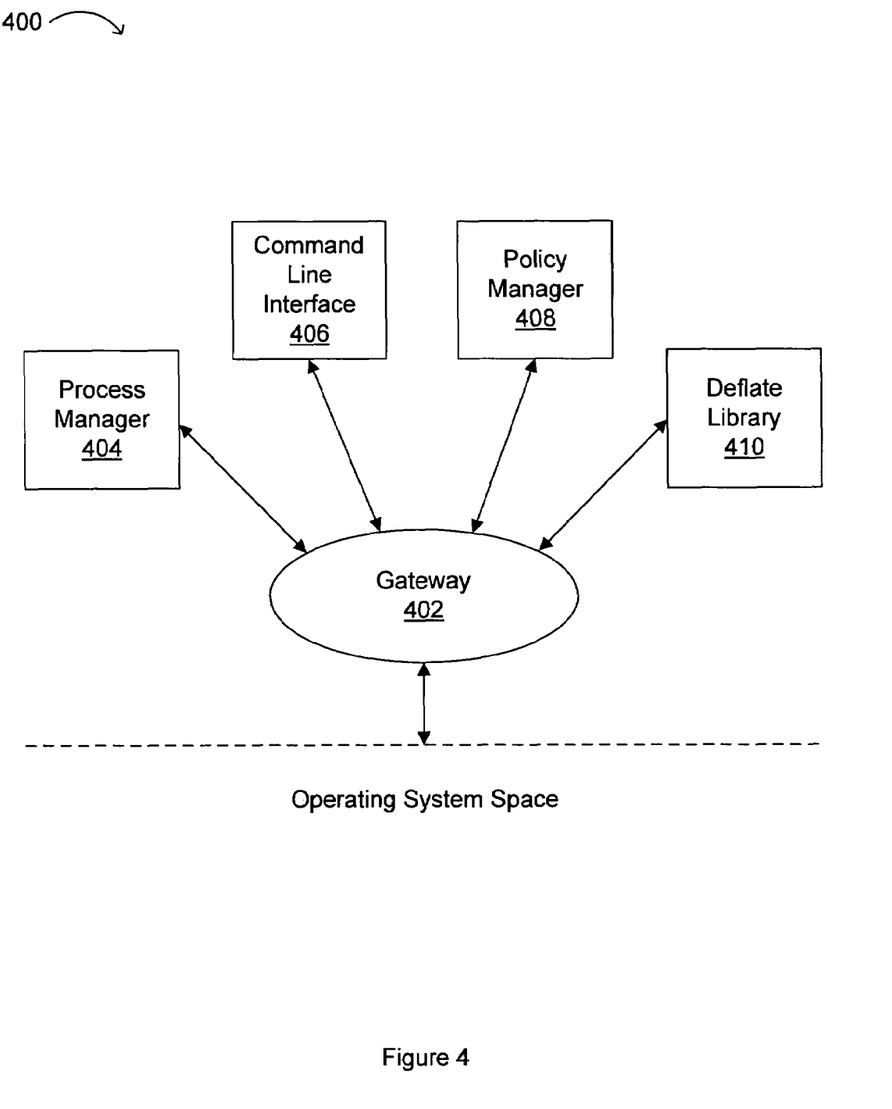
FIG. 4 illustrates an example gateway structure.

Referring now to FIG. 4, an example gateway structure is shown and indicated by the general reference character 400. Gateway 402 can be characterized as an originating gateway (OGW), or a terminating gateway (TGW). Gateway 402 can interface, via a socket interface, with an operating system's (e.g., Linux, Windows) transport stack(s), or SCTP proxy application. Further, gateway 402 can interface with process manager 404, command line interface (CLI) 406, policy manager 408, and deflate library 410, for example. In particular embodiments, software modules can run on both operating system (e.g., kernel) and user spaces, utilizing blocks as shown in FIG. 4. For example, user space modules may mainly function as a 'gateway' to terminate a TCP connection, and multiplex/demultiplex a TCP stream to/from an SCTP pipe. Further, an OGW may service a TCP connection request from a client, and a TGW may initiate a TCP connection on behalf of the client.

Figure 5:
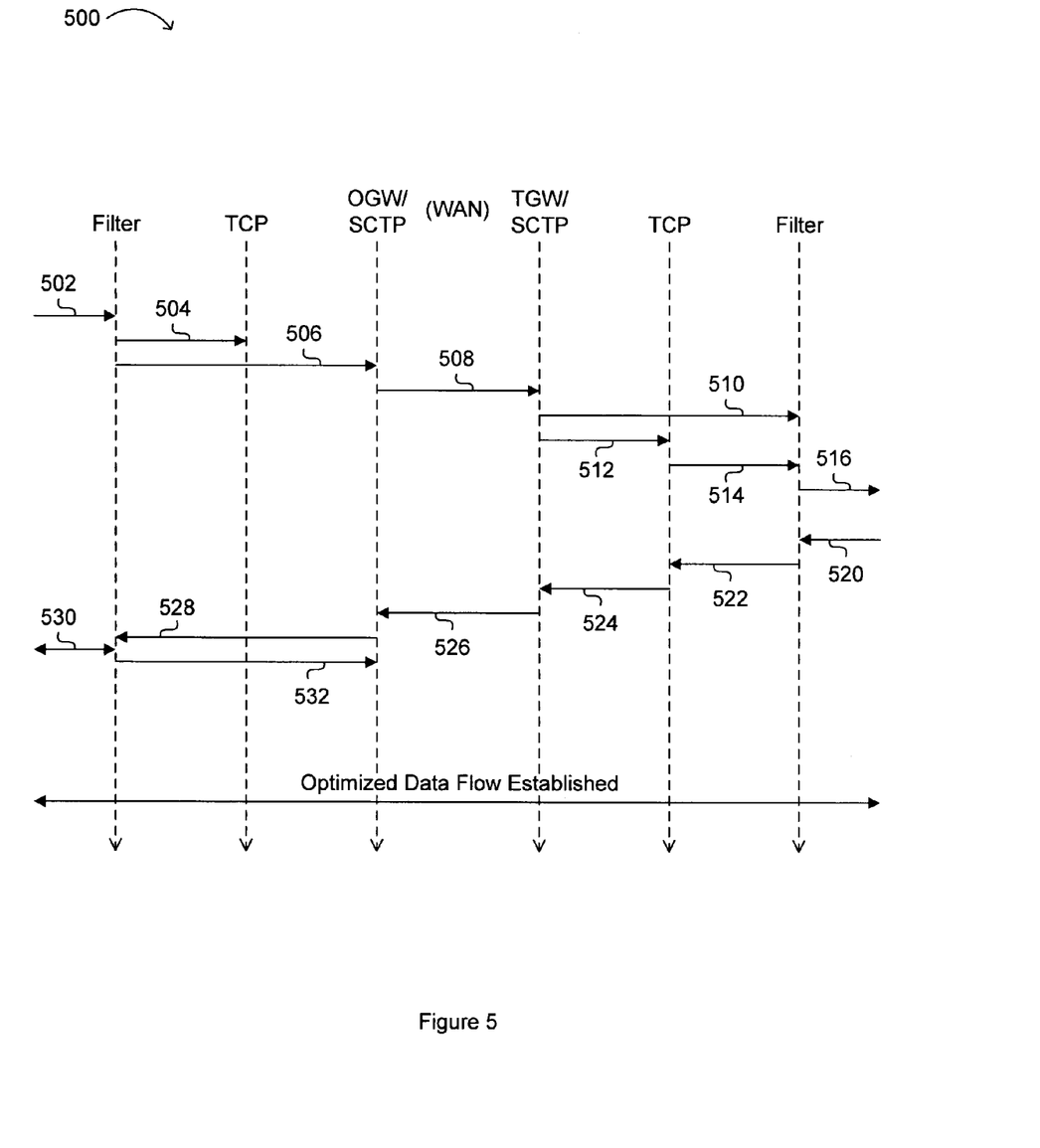
FIG. 5 illustrates an example TCP connection setup packet flow.

Referring now to FIG. 5, an example TCP end-to-end connection setup packet flow is shown and indicated by the general reference character 500. In 502, a SYN may be intercepted from the OS in the filter. In 504, the filter may replace the destination port with a special TCP port. In 506, the tuple may be passed to the OGW. In 508, an SCTP packet may be routed to TGW, passing metadata (connection request, and can contain, e.g., original IP SA/DA, TCP SP/DP, and precedence bits). In 510, program filter with tuple information can be passed to the receiving filter. In 512, connection to a destination port given by the filter can be made. In 514, SYN with special destination port can be passed to the receiving filter. In 516, the SYN can be replaced with tuple information in the receiving filter.

In 520, SYN/ACK may be intercepted from the OS. In 522, this may be converted into tuple information. In 524, an event may be accepted. In 526, an SCTP packet may be routed to OGW, and the connection establishment can be acknowledged. In 528, the gateway command filter may release SYN. In 530, an acknowledgment (ACK) can be made. In 532, a return portion of this acknowledgment can be made. In this fashion, an optimized data flow can be established, and filters on either side of the connection may continue tuple information translation.

Figure 6:
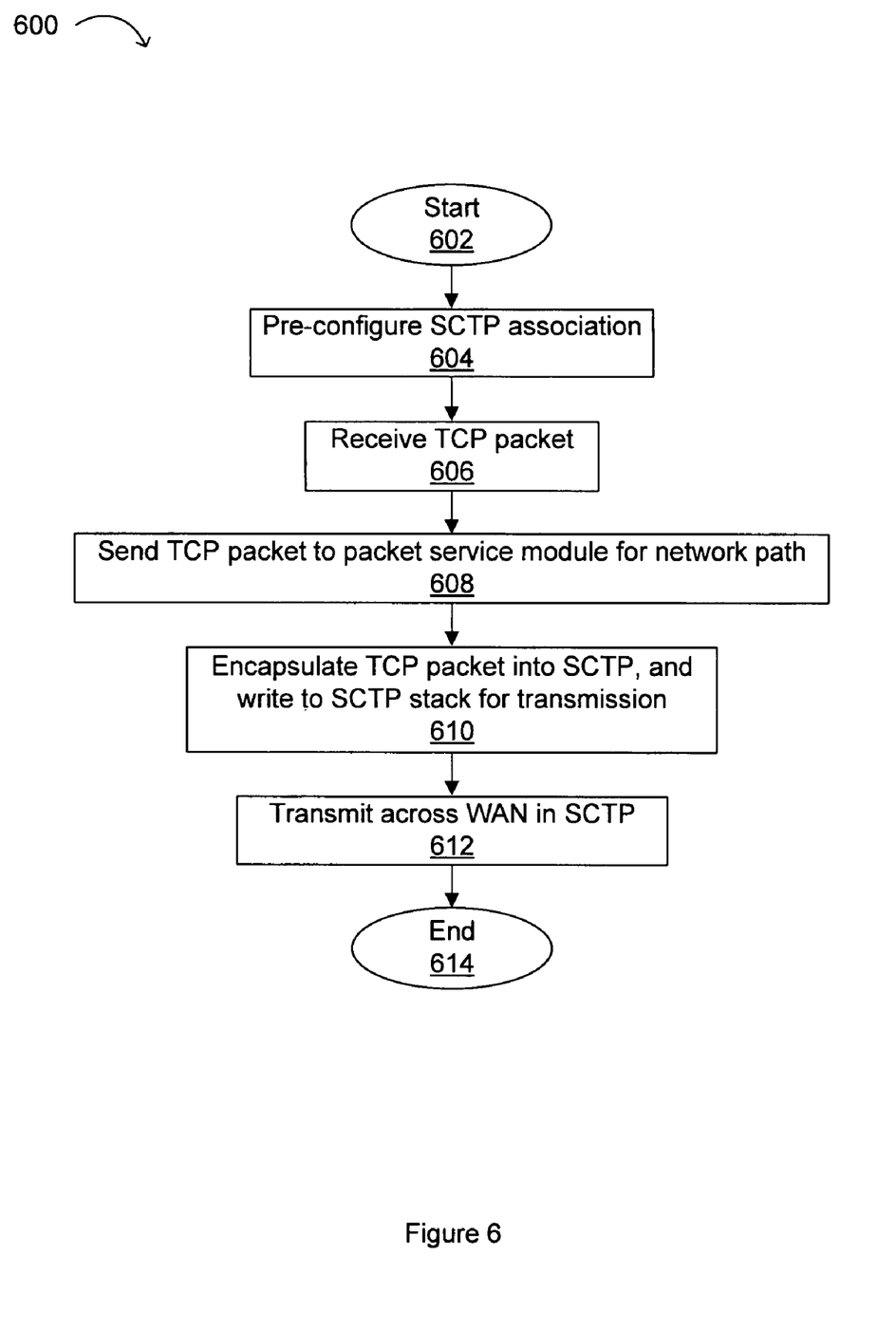
FIG. 6 illustrates an example flow diagram of a TCP/SCTP association.

Referring now to FIG. 6, an example flow diagram of a TCP/SCTP association is shown and indicated by the general reference character 600. The flow can begin (602), and an SCTP association can be pre-configured (604). Next, a TCP packet can be received (606). The TCP packet can then be sent to a packet service module for a network path (608). The TCP packet payload can be encapsulated into SCTP, and then written to an SCTP stack for transmission (610). This can then be transmitted across the WAN in SCTP (612), and the flow can complete (614).

For end-to-end flow control when a client or sever is congested, multiple TCP connections could be transported by an SCTP pipe. If the server is congested, and the congestion is detected by return code when writing to a socket, a control message (e.g., unordered) for throttling back the client may be sent to a remote gateway to notify the particular stream is under congestion. Then, that remote gateway can stop reading the client's file descriptor. A release from congestion may be sent to the remote gateway as well if the local gateway detects and the server is out of congestion. The flow control message between gateways may be sent as an 'unordered message' which can be delivered to a remote gateway.

For end-to-end flow control when an SCTP endpoint is congested, a packet service module gateway detecting a local SCTP endpoint may be designated as congested by failing to write data to an SCTP endpoint file descriptor. In this situation, a packet service module gateway can stop reading all TCP socket file descriptors associated with the congested SCTP pipe, which in turn can throttle back to senders. Accordingly, there may be no need to propagate a congestion status to remote gateways, for example.

Figure 7:
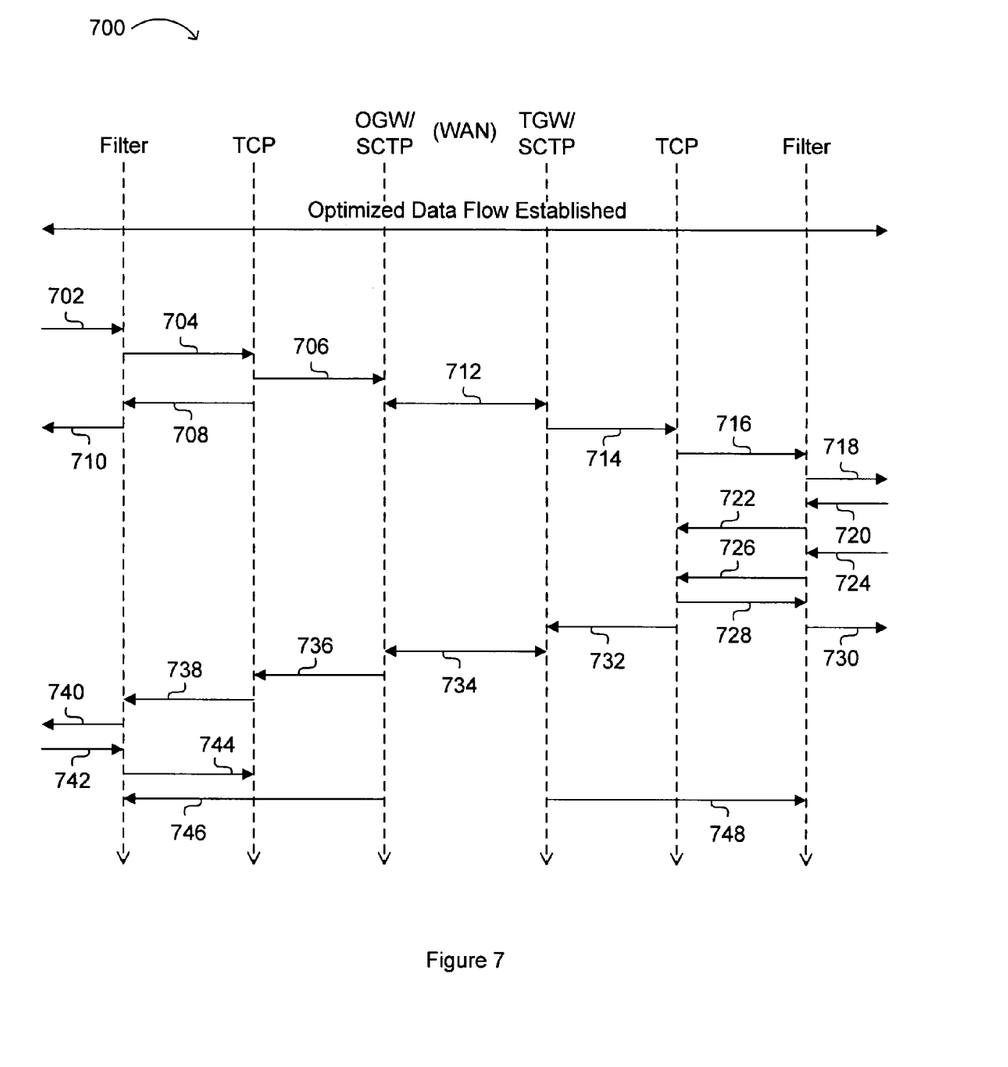
FIG. 7 illustrates an example TCP connection teardown packet flow.

Referring now to FIG. 7, an example TCP connection teardown packet flow is shown and indicated by the general reference character 700. An optimized data flow may previously have been established. In 702, a TCP RST or FIN may be intercepted in the filter from the OS. In 704, an FIN with a proper port can be sent in TCP. In 706, event notification can occur. In 708, acknowledgment (ACK) for the FIN can occur. In 710, an ACK with correct tuple information can be sent from the filter. In 712, an SCTP packet can be routed to TGW with shutdown of this direction of traffic (e.g., 4-way).

In 714, a shutdown call for this direction can occur. In 716, an FIN with a special destination port can be sent to the filter. In 718, the FIN can be replaced with tuple information in the filter. In 720, an ACK for FIN can be intercepted. In 722, the FIN/ACK can be converted. In 724, the FIN can be intercepted from the OS. In 726, the FIN can be converted. In 728, the FIN/ACK can be provided. In 730, an ACK for FIN with correct tuple information can be provided. In 732, an event notification that the forward direction is closed by the gateway can occur. In 734, an SCTP packet can be routed to the OGW, and the stream may be shutdown (e.g., 4-way). In 736, the forward direction may be closed. In 738, an FIN can be provided. In 740, the FIN may be sent, and an ACK received (742). In 744, the ACK can be propagated from the filter. In 746, the OGW may remove the filter entry. In 748, the TGW may remove the filter entry.

TCP connection can normally be closed by client or server TCP RST or FIN. If a gateway encounters severe error conditions, the TCP may be torn down by the gateway. As shown above in FIG. 7, the connection can be terminated/initiated by client. Further, gateway filter entries may be cycled or removed after the gateway has closed the connection in order to re-allocate physical filter entries. Also in particular embodiments, a half-open condition across the WAN may be disallowed.

Thus, particular embodiments can include the use of SCTP combined with local TCP acknowledgments, as well as the awareness of the proxy, to manage and maintain optimal data transmission rates across a latent link. In particular embodiments, TCP optimization can be utilized to reduce end-to-end TCP latency. In addition, multiplexing multiple terminated TCP flows into an SCTP pipe can reduce latency.

Although the description has been described with respect to particular embodiments thereof, these particular embodiments are merely illustrative, and not restrictive. For example, while examples involving TCP and SCTP protocols have been described herein, other protocols can be utilized in particular embodiments. Also, while particular network arrangements, such as LAN and WAN structures, have been described by way of examples, other types of networks and/or arrangements can also be utilized in particular embodiments. For example, particular embodiments can also be applied to relatively high latency or packet loss networks, such as satellite, transcontinental, and wireless networks.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain and store the program for use by or in connection with the instruction execution system, apparatus, system, or device. The computer-readable medium can be, by way of example only but not by limitation, a semiconductor system, apparatus, system, device, or computer memory.

Particular embodiments can be implemented in the form of control logic in software or hardware or a combination of both. The control logic, when executed by one or more processors, may be operable to perform that what is described in particular embodiments.

A "processor" or "process" includes any hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method, comprising:
    pre-configuring a plurality of stream control transmission protocol (SCTP) associations;
    receiving a transmission control protocol (TCP) packet in a network device, the TCP packet being intended for a destination node;
    encapsulating the TCP packet into an SCTP payload for a selected one of the SCTP associations based on a quality of service (QoS) determination for the TCP packet;
    sending local acknowledgements in TCP for window scaling to increase a capacity of the selected SCTP association; and
    transmitting the SCTP payload across a wide area network (WAN) in an SCTP stream on the selected SCTP association.

2. The method of claim 1, further comprising filtering the TCP packet in a packet service module.

3. The method of claim 1, wherein the receiving the TCP packet comprises using a local area network (LAN).

4. The method of claim 1, further comprising sending the TCP packet to a packet service module to perform the encapsulating.

5. The method of claim 1, further comprising performing a teardown of at least one of the SCTP associations.

6. The method of claim 5, wherein the teardown removes half-open actions.

7. The method of claim 1, wherein head-of-line blocking is avoided by each TCP connecting using a different SCTP stream.

8. The method of claim 1, further comprising retransmitting only a dropped portion of data lost on the WAN.

9. A method, comprising:
    receiving a stream control transmission protocol (SCTP) payload in a network device coupled to a wide area network (WAN), wherein the SCTP payload includes an encapsulation of a first transmission control protocol (TCP) packet, the first TCP packet being intended for a destination node;
    de-encapsulating the SCTP payload, the SCTP payload being received from a selected one of a plurality of SCTP associations based on a quality of services (QoS) determination for the TCP packet;
    regenerating the first TCP packet for transmission to the destination node; and
    sending local acknowledgements in TCP for window scaling to increase a capacity of the selected SCTP association.

10. The method of claim 9, further comprising de-encapsulating a second TCP packet from the SCTP payload.

11. The method of claim 10, wherein the first and second TCP packets include portions that are transparent to a user.

12. The method of claim 11, wherein the portions comprise address and port designations.

13. An apparatus, comprising:
    a first interface configured to receive transmission control protocol (TCP) packets;
    a circuit configured to encapsulate the TCP packets into stream control transmission protocol (SCTP) payloads for a selected one of a plurality of pre-configured SCTP associations based on a quality of service (QoS) determination for the TCP packets; and
    a second interface configured to transmit the SCTP payloads across a wide area network (WAN) in an SCTP stream on the selected SCTP association, wherein local acknowledgements in TCP are used for window scaling to increase a capacity of the selected SCTP association.

14. The apparatus of claim 13, comprising an intercept module and a packet service module, wherein the packet service module is configured to connect via TCP and SCTP connections to the intercept module, and via an SCTP connection to peer devices.

15. The apparatus of claim 14, wherein the packet service module comprises a filter, the filter being configured to select designated packets for encapsulation into SCTP.

16. The apparatus of claim 13, wherein the TCP packets include portions that are transparent to a user.

17. The apparatus of claim 16, wherein the portions comprise address and port designations.

18. An apparatus, comprising:
    a first interface configured to receive stream control transmission protocol (SCTP) payloads having encapsulated transmission control protocol (TCP) packets;
    a circuit configured to de-encapsulate the SCTP payloads and regenerate the TCP packets, the SCTP payload being received from a selected one of a plurality of SCTP associations based on a quality of service (QoS) determination for the TCP packet; and
    a second interface configured to transmit the TCP packets, wherein local acknowledgements in TCP are used for window scaling to increase a capacity of the selected SCTP association.

19. The apparatus of claim 18, wherein the TCP packets include portions that are transparent to a user.

20. The apparatus of claim 19, wherein the portions comprise address and port designations.

21. The apparatus of claim 18, wherein the first interface is coupled to a wide area network (WAN), and the second interface is coupled to a local area network (LAN).

22. A system for optimizing transmission control protocol (TCP) traffic via a stream control transmission protocol (SCTP) association, the system comprising:
    means for pre-configuring a plurality of SCTP associations;
    means for receiving a first TCP packet in a first network device, the first TCP packet being intended for a destination node;
    means for encapsulating the first TCP packet into an SCTP payload for a selected one of the SCTP associations based on a quality of service (QoS) determination for the TCP packet;
    means for sending local acknowledgements in TCP for window scaling to increase a capacity of the selected SCTP association; and
    means for transmitting the SCTP payload across a wide area network (WAN) in an SCTP stream on the selected SCTP association.

* * * * *